United States Patent [19]

Quan et al.

[11] Patent Number: 4,963,756

[45] Date of Patent: Oct. 16, 1990

[54] FOCUSED LINE IDENTIFIER FOR A BAR CODE READER

[75] Inventors: Ronald Quan, Cupertino; Brian J. Bayley, Palo Alto, both of Calif.

[73] Assignee: Hewlett-Packard Company, Palo Alto, Calif.

[21] Appl. No.: 421,520

[22] Filed: Oct. 13, 1989

[51] Int. Cl.⁵ .............................................. G06K 7/10
[52] U.S. Cl. ................................. 250/568; 235/462; 235/472
[58] Field of Search ............... 250/566, 568; 235/462, 235/463, 467, 472

[56] References Cited

U.S. PATENT DOCUMENTS

| | | | |
|---|---|---|---|
| 4,143,809 | 3/1979 | Uebbing et al. | 235/462 |
| 4,538,060 | 8/1985 | Sakai et al. | 235/472 |
| 4,570,057 | 2/1986 | Chadima, Jr. et al. | 235/462 |
| 4,682,015 | 7/1987 | Quan | 235/472 |
| 4,694,182 | 9/1987 | Howard | 250/566 |
| 4,740,675 | 4/1988 | Brosnan et al. | 250/568 |
| 4,761,544 | 8/1988 | Poland | 235/462 |
| 4,818,886 | 4/1989 | Drucker | 250/566 |
| 4,831,275 | 5/1989 | Drucker | 250/566 |
| 4,843,222 | 6/1989 | Hochgraf | 235/472 |

Primary Examiner—Edward P. Westin

[57] ABSTRACT

A focused line identifier is useful in a bar code reader employing Scheimpflug optics for focusing an illuminated line from the bar code on a two dimensional array of photodetectors. One line or a small group of lines somewhere on the array is the sharpest focus of a bar code within the working range of a bar code scanner. The best focused line is located with the analog signal before digitizing by generating a signal having an amplitude representative of the high frequency component of the lines of signal from the photodetector array. The maximum high frequency component may be found by passing the signal through a high pass filter for detecting the signal having the largest amplitude. The best focused line is, in effect, found in one field scan and used to open a gate in the next scan for passing the best focused line to a digitizer. One may also hop from the best focused line to a line or lines adjacent to the best focuesd line for feeding a slightly unfocused line to the digitizer. Further, a zone within an array of photodetectors which has the greatest illumination may be selected for disregarding spurious signals from other objects that may happen to lie in the field of view of the bar code reader.

33 Claims, 7 Drawing Sheets

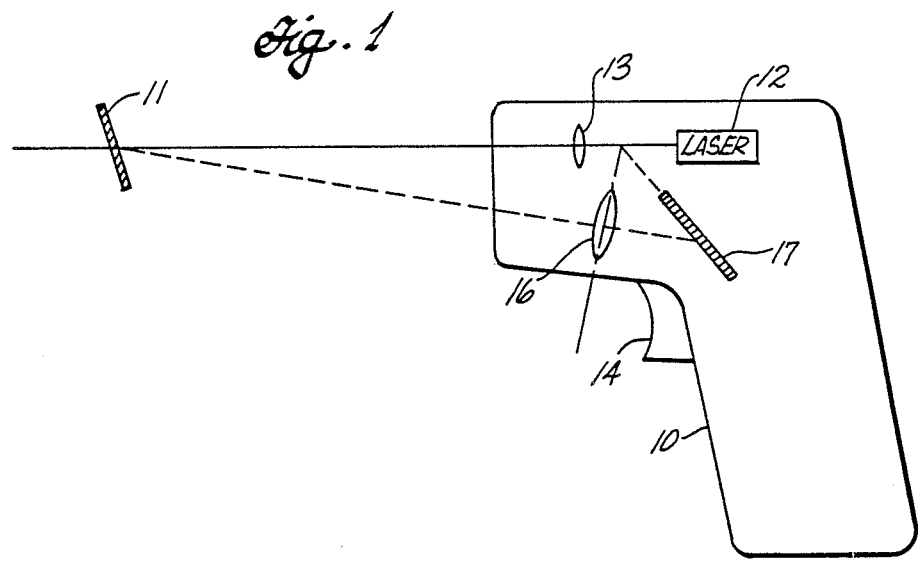

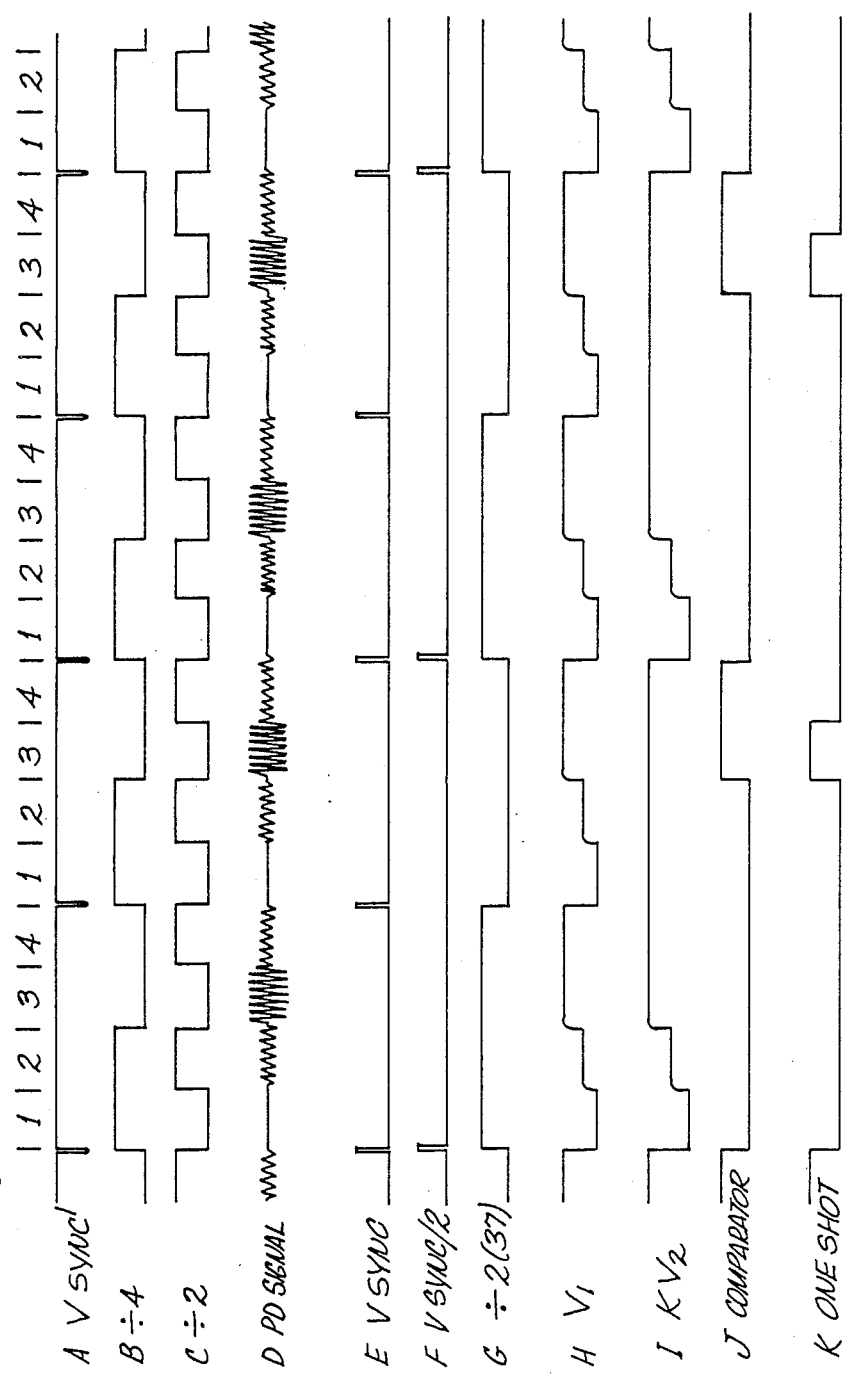

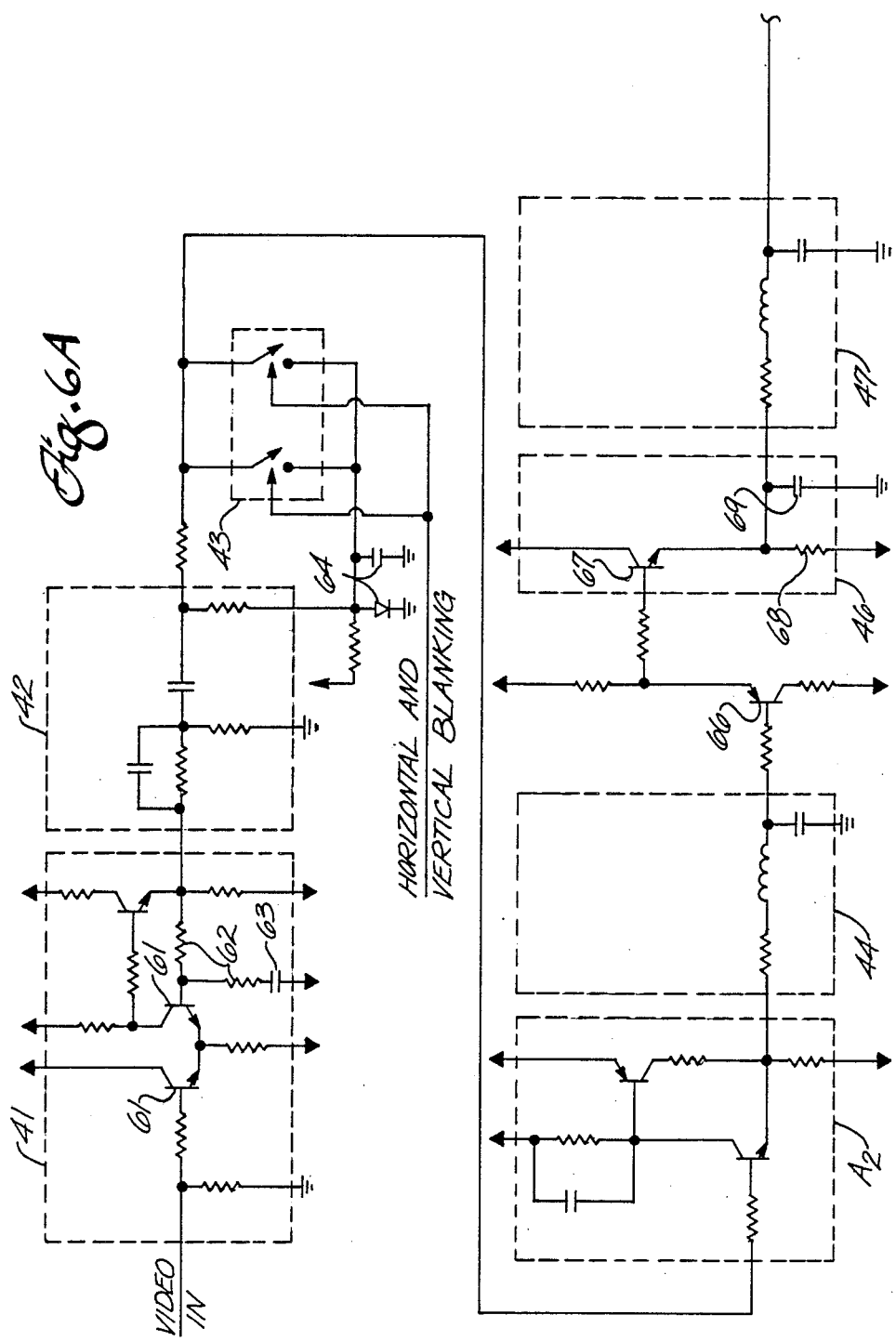

FOCUSED LINE IDENTIFIER FOR A BAR CODE READER

FIELD OF THE INVENTION

This invention concerns finding a line in a videolike raster pattern, for example, on which a bar code is most sharply focused. It is useful in a bar code reader using Scheimpflug optics. The invention processes analog signals and selects the line with the sharpest focus for conventional decoding.

BACKGROUND OF THE INVENTION

As is well known, bar codes have come into wide use for marking an incredible variety of objects for automatic reading. A substantial technology has developed for reading such bar codes to have a high first-read rate and a low substitution-error rate. Both the optical and electrical characteristics of the readers and the decoding systems have been the subject of extensive development efforts.

One type of optical system for a bar code reader employs a modified Scheimpflug arrangement. A thin fan of light illuminates a line across the bar code. When the bar code is within the working range (i.e. depth of field) of the scanner, that line is focused on an array of photodetectors. The photodetectors are sampled sequentially to produce a train of signals representative of the illumination of each photodetector. This analog signal goes to a digitizer and decoder for identifying bars and spaces and generating an output digital signal representative of the data recorded in the bar code.

One such Scheimpflug optical arrangement employs what is essentially a one-dimensional array of elongated photodetectors with the illuminated line on the bar code imaged along the length of the array. A single train of signals is obtained from such a photodetector array.

In another Scheimpflug optical system the illuminated line is focused on a two-dimensional array of photodetectors. This array is electronically scanned in a raster pattern for generating what amounts to a video signal with a plurality of "horizontal" lines across the "vertical" extent of the field. The lines are scanned sequentially, producing a train of many signals, each representing a line in the array. Those signals may then be decoded to read the bar code.

It is a characteristic of the Scheimpflug optical arrangement that there is one line in the array on which the bar code is best focused. If the bar code happens to be in about the middle of the working range of the scanner, the line having the best focus will be in about the middle of the raster pattern. If the bar code happens to be near one extreme of the working range, the image of the bar code that is in best focus will be near one extreme of the array and the signal corresponding to the line of best focus will be near the beginning or end of the train of signals representing the raster pattern. Other areas on the array may also be illuminated by the light reflected from the bar code and the focus of the bar code in those areas is poorer than the line of sharpest focus.

Sometimes there is not a single "best" focused line in the raster pattern, but a few lines may be more or less equally in focus. That is not significant in practice of this invention and any of such lines may be regarded as the "best".

It is desirable to reduce the data processing requirements of a decoder employed in such a system. The data produced during the raster scan of the entire array of photodetectors may amount to 875 kilobits in a conventional TV format or up to four megabits in a more advanced system, a formidable processing task for finding the line that is in best focus, and a large amount of memory to be devoted to storing the data until the line with sharpest focus is found. It is desirable to find the best focused line with analog processing rather than the digital processing presently employed. This permits less costly decoders or reduces delay in processing the signals and produces an output nearer to real time.

Thus, it is desirable to select a line within the raster pattern to be processed by the decoder with other lines in the array being ignored. The quantity of data to be processed can thereby be reduced, with consequent savings and without detriment to the first-read rate or substitution-error rate.

Because of the broad working range of the Scheimpflug optics it may happen that more than one bar code is imaged on the photodetector if more than one happens to be in the field of view of the scanner. This may lead to ambiguity and error. It is therefore desirable to provide means for distinguishing a primary bar code from other signals that may appear in the field of view. Again it is desirable that this be done as early in the signal processing as possible for minimizing data processing requirements and providing output near real time.

BRIEF SUMMARY OF THE INVENTION

There is, therefore, provided in practice of this invention according to a presently preferred embodiment, a focused line detector for a bar code reader which has photodetector means for generating a raster pattern of analog signal lines in a frame or field representative of illumination of the photodetector by light reflected from a bar code.

When used in a combination which also excludes spurious signals from other bar codes, means are provided for selecting a zone within the field of the raster pattern having the greatest illumination by reflected light. A line within the selected zone having the sharpest focus of the bar code is then located for decoding.

The zone may be found by a column of photodetectors at an end of the means for generating a raster pattern, connected to means for detecting which of the photodetectors in the column has the maximum signal. This corresponds to the greatest illumination and should represent the signal from the desired bar code.

A line, whether within such a zone or within the entire field of the raster pattern, is located by detecting the signals having the maximum high frequency component. This maximum component may be found by passing the signals through a high pass filter and detecting the signal having the largest amplitude.

The appropriate zone or line may be found by feeding the signals to a pair of peak detectors. One of the peak detectors is reset every field and the other is set every two fields. An output signal is then produced when both peak detectors are at their maximum during the second field. This triggers a one shot which permits passage of the signal to an output device such as a digitizer during an interval corresponding to a zone or line, respectively.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 1 illustrates schematically a bar code scanner employing Scheimpflug optics;

FIG. 2 illustrates schematically in block form a focused line detector as provided in an exemplary embodiment of this invention;

FIG. 5 is a timing diagram for the zone selector illustrated in FIG. 3; and

FIGS. 6A–6C are portions of a circuit diagram of an exemplary implementation of this invention.

DETAILED DESCRIPTION

Figure 3:
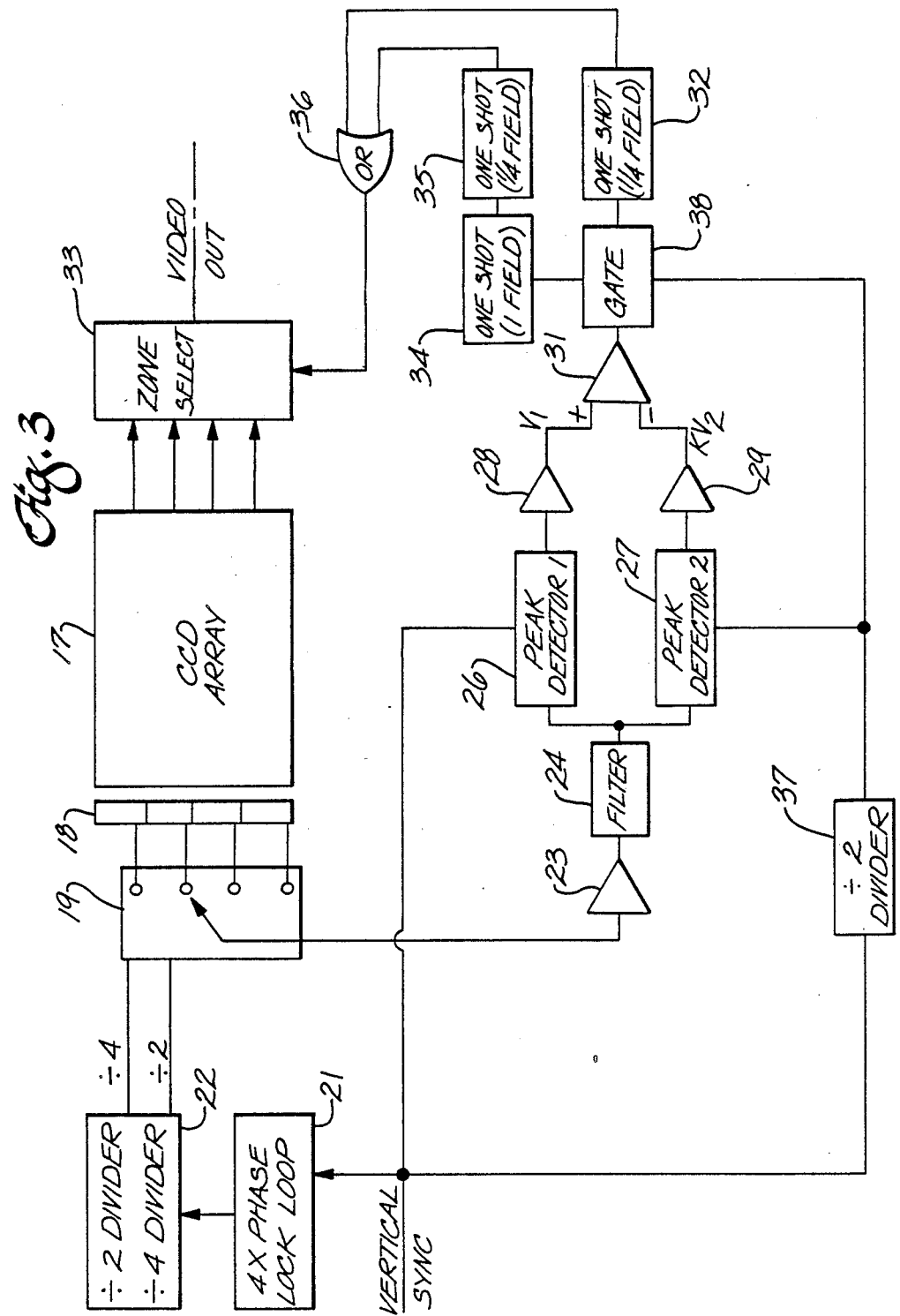
FIG. 3 illustrates schematically in block form means for selecting a zone in a photodetector array within which a focused line may be located.

FIG. 1 is a schematic illustration of a Scheimpflug optical system for a bar code scanner. The components of the optical system are mounted in a case 10 shaped so that it can be conveniently hand held and aimed at a bar code tag 11 to be read. A laser 12 or other convenient light source directs a beam of light through a cylindrical lens 13 to produce a thin fan of light in what is considered for purposes of exposition herein to be in a horizontal plane. The fan of light is wide enough to illuminate a line at least as long as the full length of a bar code to be read at the near end of the working range of the scanner. Working range means essentially the depth of field within which the scanner is useful.

The user aims the scanner at the bar code, and then presses a trigger switch 14 to activate the scanner. The aim may be adjusted so that the fan of light forms a line through the bar code transverse to the length of the bars and spaces of the bar code. Light reflected from the bar code passes through an imaging lens 16 and is imaged on a two dimensional array of photodetectors 17.

Other features may be included in the bar code scanner and form no part of this invention. For example, a band pass filter may be included in the path of the reflected light for rejecting stray light at wavelengths different from the laser wavelength. Polarizers may also be used in the optical path. It may also be desirable to modulate the laser output such as, for example, at 100 kHz so that laser light reflected from a bar code may be distinguished from other radiation when finding a zone within which a well focused line is found.

The sheet of light from the laser illuminates only a thin strip across the bar code. The Scheimpflug optical arrangement guarantees that the illuminated strip will form a focused image on the photodetector array 17. The Scheimpflug arrangement has the principal plane of the imaging lens 16 and the plane of the photodetector array 17 intersecting each other and the plane of the illumination beam from the laser at a common line. All points along the illumination beam within the working range of the scanner are imaged some place on the photodetector array.

If the bar code happens to be in the working range nearer the laser, the focused line is near the lower edge of the photodetector array. On the other hand, if the bar code tag is at about the far end of the working range the focused image is near the upper edge of the photodetector array. The dimensions of the array and its position in the image plane, the angle between the plane of the detector array and the plane of the imaging lens 16 and its focal length may be varied to obtain a desired working range and resolution for the bar code scanner.

The detector array is a two-dimensional array of individual photosensors as indicated schematically in FIG. 3. Charge-coupled devices (CCD) are convenient for this purpose since they can be made economically in small size with large numbers of quite sensitive photodetectors. Other types of photosensors may be employed. An exemplary array may have 100 rows of photodetectors with 1000 pixels in each row or line of the array. Alternatively, the photodetectors may represent a full field corresponding to a commercial television image. The number of lines and number of pixels per line is not material to practice of this invention.

To obtain electrical signals for processing, the photodetector is scanned in a raster pattern in a conventional manner. For example, each photodetector in a horizontal line (or row) across the array is sequentially sampled to produce a train of sequential signals. Such scanning patterns include a blank space (and blanking signal) at the end of each line.

The electronic scanning of an entire array is referred to herein as a field or frame. The scan along one row is referred to as a line. The electrical signal obtained by scanning across such a row may also be referred to as a line. Such terminology is consistent with terminology employed for other video systems. Terminology common to video systems is used herein, and the signals containing the illumination data from an array of photodetectors is referred to as a video signal. The line of reflected light imaged on the photodetector plane is generally referred to as the focused line. The term "zone" is used herein to refer to a group of lines in the raster pattern.

Care should be taken in reading "scan" since this term is used in two senses in the art. It may be used in the context of "scanning" a bar code, referring to the act of sensing the pattern of the bar code with a "scanner". Alternatively, when referring to an array of photodetectors or the like, "scanning" concerns traversing the array to obtain a sequence of signals representative of the illumination of the array. Typically, this may be a raster scan, line by line across the array.

The scan across each horizontal line is preceded by a horizontal sync signal, and a scan across a full field of the array is triggered by a vertical sync signal.

The focused line imaged on the photodetector array from the bar code is not necessarily coincident with a row on the array. If the bar code is tilted, the focused line may be skewed relative to a row on the array. If the bar code is curved, such as on a can, there may also be curvature in the focused line. Even so, there will be a row on the photodetector where the line is, on average, in sharpest focus. It is desirable to read that line with the bar code reader since it should give the best signal and least likelihood of error from the decoder. An embodiment of this invention involves locating that line of best focus in the train of signals from the raster pattern.

It may also be desirable to exclude a second focused line on the array such as may occur if a second bar code happens to lie in the fan of light illuminated by the scanner or if the second bar code happens to lie in a strong ambient light source. The second focused line should almost certainly fall in a different region on the array since the second bar code (if any), should be at a different distance from the scanner. Means may therefore be provided for discriminating between the principal focused line from the desired bar code and some other line.

For this latter purpose a vertical column of auxiliary photodetectors 18 is provided at one end of the array. If desired, a second column may be provided at the opposite end operating in the same way. In the exemplary embodiment four such auxiliary photodetectors are used to define four zones on the photodetector array, each zone including one fourth of the raster lines. If desired, a different number of auxiliary photodetectors and zones may be used.

A desired focused line on the photodetector array includes a portion overlapping the column of auxiliary photodetectors at the end of the array. Since the desired bar code is almost always closest to the scanner, the amount of modulated light reflected from it will be greater than from other objects imaged on the photodetector array. Thus, the auxiliary photodetectors are used to find the zone within the field of the raster pattern which has the greatest illumination. The best focused line should be in that zone.

A solid state four-pole switch 19 is connected to the four diodes forming the column of photodetectors. A phase-lock loop 21 is used to generate control pulses at four times the field frequency. By inserting $\div 2$ and $\div 4$ dividers 22, control pulses are created to drive the four-pole switch. The resultant sequence of signals from the four photodetectors are applied to a transresistance amplifier 23 for converting the photodiode current to a signal voltage. This signal is directed to a band pass filter 24 tuned to the frequency of the modulated laser beam. This reduces noise from stray light not originating from the laser. An amplifier (not shown) may be included after the filter to offset voltage drop in peak detectors to which the signal is next applied.

The timing or waveform curves in FIG. 5 are useful for understanding some of the sequential events occurring as the zone selection detector operates. The first of the waveforms illustrated is representative of the scanning across the array of photodetectors 17. Also indicated above waveform A in FIG. 5 are four intervals corresponding to the zones monitored by the four auxiliary photodiodes at the end of the array. Scanning occurs during the ON period represented by the higher portion of the waveform. Each ON period corresponds to a time interval required to scan all of the photodetectors in the array. There is then a short OFF period, usually referred to as a vertical blanking analogous to the time required for the raster scan of a television CRT to return to the beginning of a field.

Even in a raster scan of a CCD array different from commercial TV, it is desirable to retain a blanking period at the end of each frame or field to avoid interference by spurious noise due to the vertical synchronization. A similar blanking (not shown) may be employed for each horizontal sync signal as well.

The next two waveforms B and C are the signals from the $\div 4$ and $\div 2$ dividers which, in effect, provide binary numbers 00, 01, 10, and 11 to which the four-pole switch 19 responds.

Assuming that the brightest image on an auxiliary photodetector is in the third zone, a waveform somewhat like that in line D of FIG. 5 may be observed. During the time the switch is on the third zone, the signal strength from the transresistance amplifier 23 is at a maximum, as indicated by this waveform.

This signal, after passing through the filter 24, is applied to both of a pair of identical peak detectors 26, 27. The first peak detector is reset at the beginning of each field as indicated by the vertical sync line to the peak detector 26 in FIG. 3 and by the waveform in line E on FIG. 5. The second peak detector 27 is reset at the beginning of every second field as indicated by the line in FIG. 3 from the $\div 2$ divider 37 and the waveform of line F in FIG. 5. The reset pulses are obtained from the vertical sync signal.

The output of the first peak detector is buffered by an amplifier 28 to form a voltage $V_1$. The output of the second peak detector 27 is buffered and attenuated slightly by an amplifier 29 to form a second voltage $KV_2$ where K is a constant a little less than 1. The result is that for a given light intensity on an auxiliary photodetector, the output voltage from the first peak detector is slightly higher than the output voltage from the second peak detector.

These two voltage signals are applied to a comparator amplifier 31 so that when $V_1$ is greater than $KV_2$, the output of the comparator is high. The output of the comparator is, however, kept low during the first one of each pair of fields by a $\div 2$ divider 37 connected to the vertical sync pulse and gate 38 for inhibiting the comparator 31, as indicated by line G in FIG. 5.

During the scan across the auxiliary photodiodes during a first field, the peak detectors each find the maximum signal corresponding to the auxiliary photodiode with the brightest illumination. This is shown in FIG. 5 by waveform H indicative of the first peak detector voltage $V_1$, and waveform I indicative of the second peak detector voltage $KV_2$. Both of these voltages go high during the scan of the third zone photodiode which, in the example used for description, is the most brightly illuminated.

At the end of the first frame or field, the first peak detector is reset and its voltage $V_1$ goes low. The voltage from the second peak detector $KV_2$ remains high.

During the next field when the voltage of the first peak detector $V_1$ again finds its maximum, it will exceed the $KV_2$ voltage of the second peak detector by a slight amount and cause the comparator 31 to go high, as indicated by waveform J in FIG. 5.

The output of the comparator is applied to a one shot 32 timed to stay high for exactly one-quarter field or one zone, as indicated by waveform K in FIG. 5. This signal enables a zone selection circuit 33 which passes the video signal from the photodetector array 17 during the selected zone. The quarter field represented by this zone is the one in which the greatest illumination in the focused line is to be found.

If desired, a repetition rate of every field, instead of every other field, may be provided by having an additional one shot 34 with a full field delay feeding another one-quarter field one shot 35 with both of the one-quarter field one shots 32 and 34 coupled to an OR gate 36 for enabling the zone selection circuit 33. The zone selection circuit may be a simple transmission gate for the CCD video controlled by way of the output OR gate 36.

The video signal, i.e. the raster scan of the photodetector array, whether a hundred lines, the NTSC standard number of lines or some other number of lines, is then processed to find the best focused line illuminating the array. In the illustrated embodiment, the video signal is from one zone within the array, selected as hereinabove described. This is not an essential feature of finding the best focused line, and in many embodiments, the video signal from the entire array is processed as hereinafter described.

The video signal is amplified by an amplifier 41 and the high frequency component is retained by filtering the train of signals through a high pass filter 42. A blanking switch 43 is turned on during the horizontal and vertical blanking intervals for eliminating the sync pulses and vertical interval pulses. This is important so that the high frequency content of the signal from the array can be assessed only during scanning of active horizontal lines. Sync pulses and the like have a great deal of high frequency content due to their fast rise times, which could cause measurement errors if not eliminated.

A first low pass filter 44 with its cutoff frequency set above the video bandwidth is placed after the blanking switch 43 for eliminating any superfluous out-of-band noise from the incoming video signal or switching noise from the blanking switch.

At this point in the analysis for finding the best focused line, that is, after the first low pass filter, the signal for each active horizontal scan line has an amplitude approximately in proportion to its high frequency content. This is significant since the best focused line produces signals from the array having a larger high frequency content than lines that are not in sharp focus.

The reason for this is that a bar code that is in sharp focus has a short transition between completely black bars and completely white spaces. Thus, a scan along such a focused line is like a square wave. On the other hand, if a line is out of focus, there is a more gradual transition between the dark and light areas and the wave form of signals from scanning along the unfocused line is quite rounded. As is well known, a square wave has a much larger high frequency component than a "smoother" wave, with a sine wave being the ultimate, having only its fundamental frequency.

This invention locates the line of sharpest focus by finding the line with the largest high frequency content.

An envelope peak detector 46 and second low pass filter 47 set each video horizontal line from the first low pass filter to a voltage in relation to its high frequency content. The voltage from the second low pass filter is buffered and amplified by an amplifier 48 and fed to two matched peak detectors 49 and 50. At this point the analysis to find the focused line resembles the analysis used to find the best illuminated zone with the circuit illustrated in FIG. 3. There are of course more lines to consider than zones, but the concept is substantially the same.

The first peak detector 49 is reset every field. The second peak detector is reset every two fields. The second peak detector holds or remembers a DC value that represents the largest amount of high frequency content of the horizontal lines in the field during two field sweeps. The value of the voltage held during the second sweep of the field is attenuated slightly by an attenuator 51 to provide a basis for comparison as hereinabove described. Another attenuator 52 is connected to the first peak detector for matching of the two legs of the system, but the attenuation, if any, of the signal from the first peak detector is less than that of the signal from the second peak detector. A similar result could be obtained with amplifiers A4 and A5 having different gains.

The first peak detector rises to a DC value that also represents the highest amount of high frequency content of the horizontal lines in the field, but that signal is used only during the second field sweep. In other words, comparison of the voltage levels is made after the first peak detector is reset while the second peak detector is not. When the voltage held by the first peak detector 50 is at least as large as the voltage held by the second peak detector from the first sweep, a comparator 53 turns high until the end of the field. A vertical gate switch 54 allows measurement of the comparator's output only during the sweep of the second field.

A D flip-flop 56 clocked by the horizontal sync pulse turns high after the first focused line pass. At the beginning of the next focused line, the D flip-flop is clocked high, which triggers a one shot 57. The flip-flop is used to assure that the output pulse does not occur in the middle of the horizontal line, but at the beginning of the next full line. The one shot is timed for one horizontal line length and its pulse output is the gate for the portion of the video signal containing the focused line, permitting it to pass to the digitizer. Thus, a focused line is found in real time without digital processing. For example, when using a standard NTSC television system for bar code reading, the pulse output from the one shot is 63.5 microseconds and focused line identification is generated every 33 milliseconds.

Figure 4:
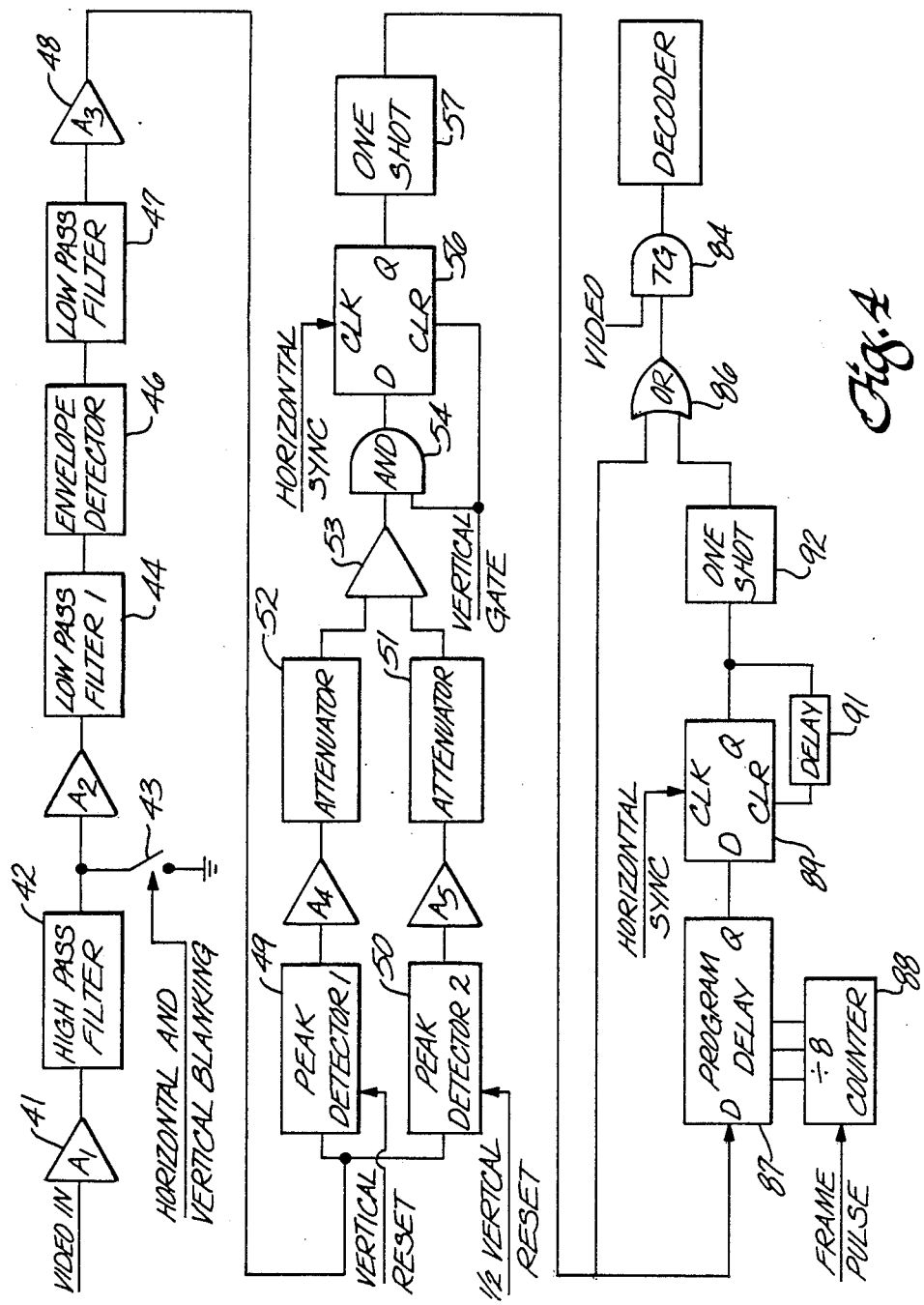
FIG. 4 illustrates schematically in block form means for locating a line of sharpest focus in a raster pattern.
Figure 6B:
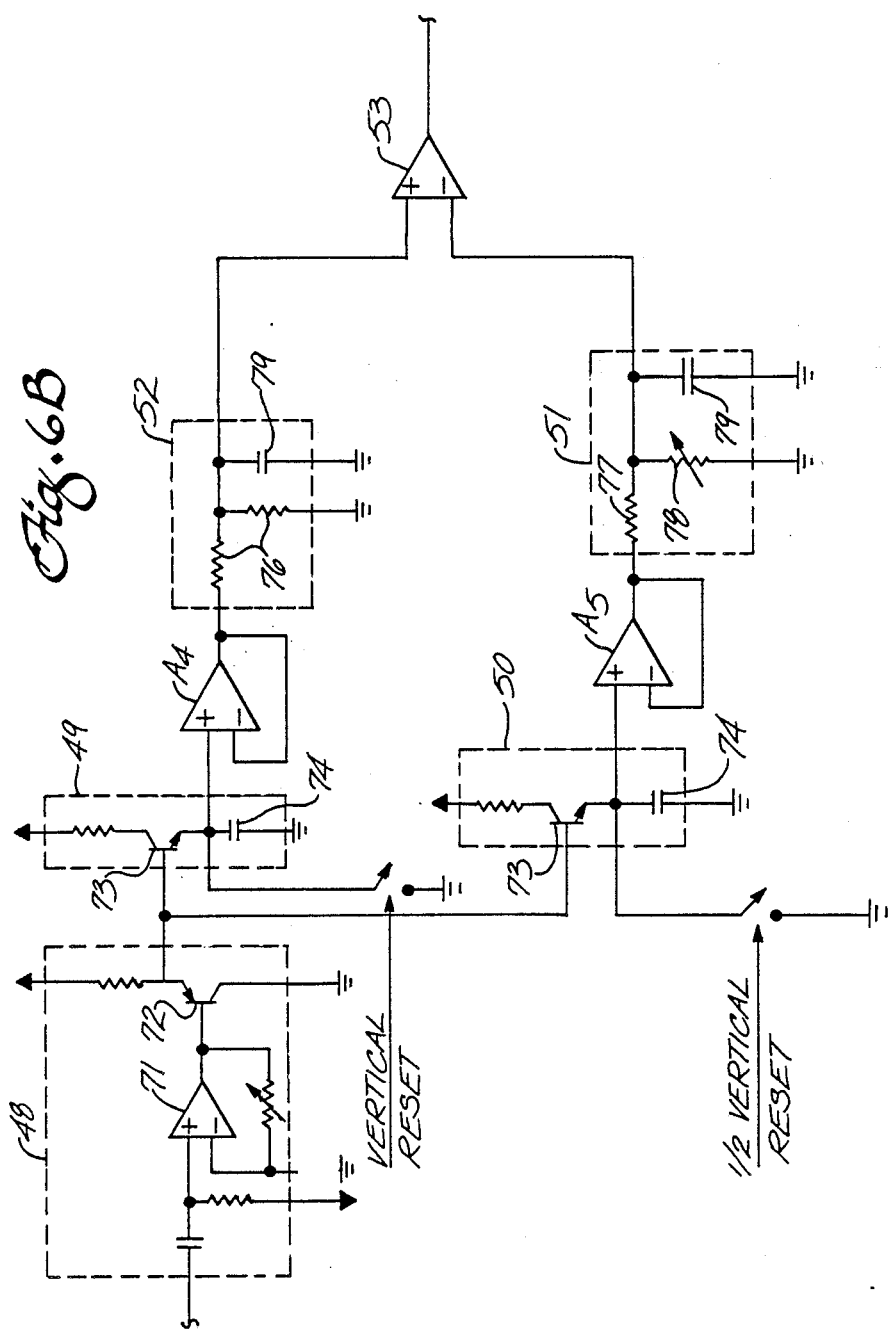
Figure 6C:
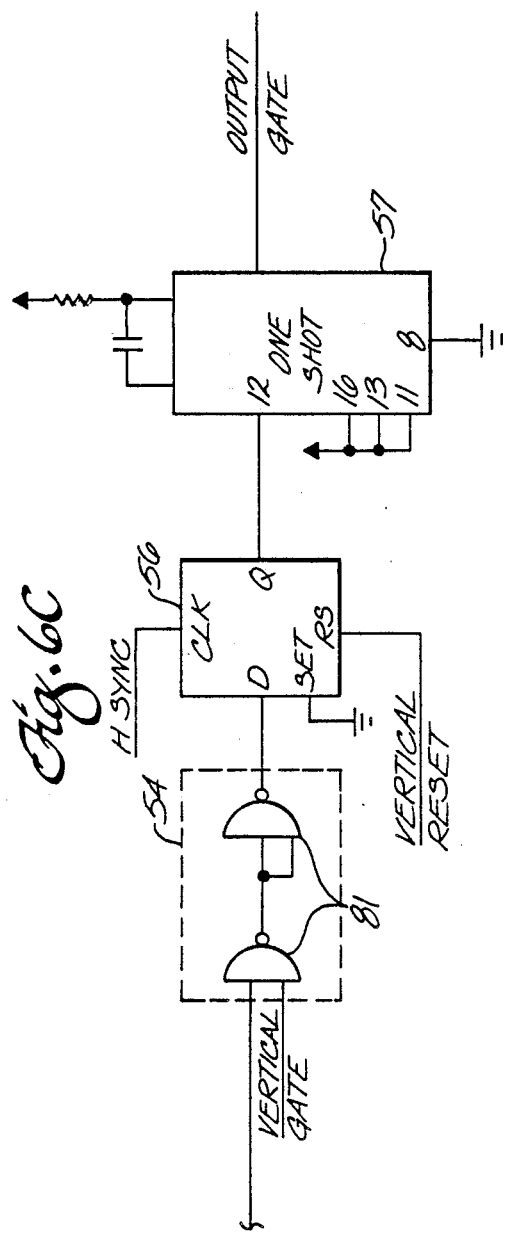

FIG. 6 is an exemplary circuit diagram for the focused line identifier illustrated in block form in FIG. 4. The various functions of the block diagram are indicated by the same reference numerals and dashed outlines for most of the functional blocks. A quick review of the circuit serves as a recapitulation of performance of the focused line identifier.

The amplifier 41 is essentially a video amplifier with transistors 61 forming a differential pair amplifier with a third transistor as an emitter follower output stage. Gain of the amplifier is determined by feedback resistors 62. A capacitor 63 averages out the "white" portions of the video signal so that the amplifier can handle a large video signal amplitude.

The high pass filter 42 is a conventional RC second order filter so that the more the bar code is in focus, the higher the signal output is from the filter. A higher order filter may also be used.

A diode and capacitor 64 form a voltage reference and thus an AC ground so that when the blanking switch 43 turns on during horizontal and vertical blanking, noise from sync signals which may appear as a high output from the filter are eliminated. Thus, the input to the amplifier $A_2$ comprises signals only during active horizontal lines. The amplifier $A_2$ is a compound emitter follower.

The two low-pass filters 44 and 47 are RCL tanks. The first low-pass filter removes transients caused by the blanking switch and noise from the incoming video signal. A transistor 66 with associated resistors comprises a level shifter and buffer for the output of the first low pass filter 44. This shifts the voltage up so that the next stage, the envelope detector 46, does not have dead band distortion.

The envelope detector comprises a transistor 67 with a discharge current resistor 68 and holding capacitor 69. The envelope detector 46 forms a DC voltage for each horizontal scan line in relation to the amount of high frequency content in each line. For example, the more high frequency components, the higher is the DC output of the emitter of the transistor 67.

The second low pass filter 47 smoothes the DC value. This DC value in practice appears as a pulse that may be amplified by a capacitor coupled amplifier 48.

The amplifier 48 amplifies the DC voltage from the low pass filter representing the active horizontal line. It comprises an op-amp 71 and output stage transistor 72. The transistor level shifts and buffers the output for eliminating deadband distortion for the peak detectors 49 and 50. The emitter has a DC voltage in proportion to the high frequency components of each active horizontal line and provides the inputs to the two peak detectors.

Each of the two matched peak detectors comprises a transistor 73 and capacitor 74. The first peak detector is reset every field by the vertical reset pulse. The second peak detector is reset every other field. The amplifiers $A_4$ and $A_5$ avoid droop in the capacitors 74 before reset.

These amplifiers are also buffering amplifiers to drive attenuation networks 52 and 51. The attenuator network 51 for the first peak detector comprises fixed resistors 76. The attenuation network 52 for the second peak detector comprises a fixed resistor 77 and a variable resistor 78. The variable resistor is adjusted to be slightly lower in peak detected voltage at the input to the comparator amplifier 53 than the input from the first peak detector.

Since this adjustment may cause the comparator to turn on high at times when maximum high frequency response is not achieved, a vertical gate pulse is used to the AND gate 54 to let through high pulses from the comparator only after one peak detector detects the highest high frequency modulation or best focused line during one field and a pulse is set off during the next field for one of the best focused lines.

Capacitors 79 are used for filtering any noise form the inputs to the comparator.

The NAND gates form an AND gate to gate out the pulse that may appear in the first field and let through the pulse in the next field corresponding to the best focused line. Since this valid pulse may start in the middle of a horizontal line, which could lose some data from the complete bar code, the next complete line is gated instead through the D flip-flop 56. This triggers the one shot 57 which results in a single pulse of one horizontal line length which occurs during one of the best focused lines in the field.

The balance of the block diagram in FIG. 4 provides two desirable auxiliary functions. It will be noted that the signal from the one shot 57 provides a usable gate for admitting the focused line video signal to the digitizer and decoder. It has been noted above that there is an output gating signal from the focused line identifier every other field. It is desirable to have such a signal in every field to increase the repetition rate. This is not so much a matter of reducing the time to obtain an output, as it is a matter of increasing the number of repetitions of reading of data while a bar code is in the field of view of the scanner. Such a higher repetition rate could be obtained by replicating the circuit and time shifting it one field, but there is an easier way.

Further, it should be apparent that the line actually gated by the one shot may not be the "best" focused line since the one shot is triggered at the beginning of the line following the one in which the "best" line is found. A few lines may actually be the "best" if the best focused image of the bar code is skewed or curved relative to the horizontal lines of the photodetector array. Thus, it may be desirable to hop back one line. On the other hand, it may also be desirable to hop forward one line (i.e. later in the scan). Slightly out of focus lines may be useful in optically low pass filtering poorly printed bar codes that result in noisy signals. Thus, means are provided for hopping a few lines adjacent to and on either side of the line found to be in sharpest focus.

The output of the one shot 57 is one input to an OR gate 86. The one shot output is also input to a program delay one shot 87. The duration of the one shot is exactly one field plus or minus a line or desired number of lines. For example, with a full standard TV field and reasonable decoder capacity, the number may be as much as plus or minus four lines as controlled by a ÷8 counter 88. The programmable one shot 87 is initially set less than one full field and then extra delays are added as desired. By using a counter to increment this hopping, a regenerated pulse may be different for each field until a full count by the ÷8 counter.

The output of the programmable one shot 87 is input to a flip-flop 89 which receives a horizontal sync signal to assure a timing start at the beginning of a video line. A delay 91 from the flip-flop output to the CLR input resets the flip-flop after its output fires a one shot 92. The output of the final one shot 92 is exactly one horizontal line and forms the other input to the OR gate 86.

The OR gate is input to a transmission gate 84 which permits a video line to pass to the digitizer.

This means that every other field the best focused line is selected by the first one shot 57 and in the intervening fields a line of best focus or a line slightly out of focus is selected by the final one shot 92. Clearly, this may be implemented without the line hopping to provide the best focused line in every field instead of every other field.

There are, of course, modifications that may be made in circuits for obtaining the desired focused line identification, for selection of zones in an embodiment for screening for the brightest bar code, and in line hopping. Some of these may be circuit changes such as connecting the CLR input of the flip-flop 89 in the "every field" embodiment to the output of the final one shot 92, thereby eliminating the delay associated with the flip-flop.

Some modifications at least seem more profound. Adding a resistor in series with the emitter of envelope detector transistors 67 will tend to average a certain amount of high frequency pulses. This averaging ignores "bright spots" from less focussed parts of the bar code as part of the high frequency measurement. This essentially pulse counts so that the system is sensitive to areas of the array where sustained high frequency pulses are found (as opposed to just one or two sharp edges in an area of the array).

Yet another method is to replace the peak detector that is reset every field with a unity gain buffer amplifier. Since the envelope detector contains voltage proportional to high frequency every line, this voltage rises to its peak during best focus, and to smaller voltage for less focussed lines. By setting the other peak detector to a lower voltage, the line identifier gates out lines of near focus along with the line of maximum focus.

Also, even though described in the context of a hand held scanner employing Scheimpflug optics, either of these features may be replaced with equivalent features. For example, the "scanner" may be fixed in position with articles having bar codes passed in front of the scanner. Other tilted image plane bar readers may be used. Further, techniques provided in practice of this invention may be used for locating a bar code in an image field containing other objects or graphics. The bar code in such an image may have a substantially higher high frequency content than other parts of the image.

The system was also described with its own light source, however, it may also be useful when the bar is illuminated with ambient light or an external light source. The illumination by the scanner is convenient in a hand held device so that the user knows best where the aim the scanner. It is also desirable when principles of this invention are employed to find a zone within which a focused line is most likely to be found. In such an embodiment a band pass filter may be used to limit the radiation illuminating the auxiliary photodetectors, or the light source may be modulated for similar reasons.

The scanner is described as feeding analog signals to a digitizer, which in turn provides signals to a decoder. These components are part of a complete system, but parts of it may be provided by different vendors and connections made at various points in the system. For example, a hand held scanner might have as its output a stream of analog signals. The digitizer might be included in the scanner with digital signals going to an external decoder. The scanner may have as its output a stream of pulses with length modulated according to the pattern of the bars and spaces of the bar code. Any or all of these may be included in the scanner.

The preferred embodiment employs an array of CCDs or the like which are electronically scanned in a raster pattern. It will be apparent that another technique for obtaining a stream of signals is with a line of photodetectors which is traversed across an image, or even a single photodetector mechanically scanned across an image. The stream of signals may be stored in registers for slightly delayed analysis.

A variety of other modifications and variations will be apparent to those skilled in the art and it is therefore the be understood that within the scope of the appended claims the invention may be practiced otherwise as then specifically described.

What is claimed is:

1. A focused line identifier for a bar code reader comprising:
    photodetector means for generating a pattern of analog signal lines representative of illumination of the photodetector means by light reflected from a bar code;
    means for selecting a zone within the field of the pattern having the greatest illumination by light reflected from the bar code;
    means for locating the line within the selected zone having the sharpest focus of the bar code; and
    means for feeding the analog signals in the located line to a digitizer.

2. A focused line identifier as recited in claim 1 wherein the means for selecting a zone comprises a column of photodetector elements at an end of the photodetector means for generating a pattern, and means for detecting which of the photodetector elements has the maximum signal.

3. A focused line identifier as recited in claim 1 wherein the means for locating a line comprises means for detecting the line in the pattern having the maximum high frequency component.

4. A focused line identifier as recited in claim 3 wherein the means for detecting the line having the maximum high frequency component comprises:
    a high pass filter;
    first and second peak detectors connected to the high pass filter;
    means for resetting the first peak detector every two fields;
    means for resetting the second peak detector every field;
    means for producing an output signal when the second peak detectors has at least as large a signal as the first peak detector in the second field; and
    means for switching the detected line to the digitizer for an interval of one line.

5. A focused line identifier as recited in claim 3 wherein the means for detecting comprises:
    first and second peak detectors;
    means for resetting the first peak detector every field;
    means for resetting the second peak detector every second field; and
    means for producing an output signal when the first peak detector detects a line having a high frequency component at least as large as the high frequency component detected by the second peak detector in the first field.

6. A focused line identifier as recited in claim 1 further comprising means for switching lines adjacent to the located line to a means for digitizing.

7. A focused line identifier as recited in claim 1 further comprising means for switching a located line to a digitizer during every scan across the pattern.

8. A focused line identifier for a bar code reader comprising:
    a two dimensional photodetector array for generating a pattern of scan lines;
    means for identifying a line in the array having a maximum high frequency component; and
    means for gating the identified line to a digitizer for digitizing a bar code signal.

9. A focused line identifier as recited in claim 8 wherein the means for identifying comprises:
    means for identifying a line of maximum high frequency component in a first scan across the array; and
    means-enabling the gating means when the identified line occurs in the next scan across the array.

10. A focused line identifier as recited in claim 8 wherein the means for identifying comprises:
    a high pass filter for receiving the signal from the array;
    an envelope detector connected to the filter for providing a signal having an amplitude related to the high frequency component through the filter;
    a first peak detector for remembering the maximum amplitude during a second scan across the array; and
    a second peak detector for enabling the means for gating when the amplitude during the second scan across the array exceeds the remembered amplitude.

11. A focused line identifier for a bar code reader comprising:
    means for generating a pattern of a vertical plurality of horizontal scan lines representative of illumination of an area by light reflected from a bar code;

analog means for identifying a line in the pattern with the sharpest focus of light reflected from the bar code; and means for gating the pattern to a digitizer during an interval corresponding substantially to the identified line.

12. A focused line identifier as recited in claim 11 wherein the analog means for identifying comprises:

means for generating a signal having an amplitude representative of a line having a maximum high frequency component during a first scan of the pattern;

means for generating a signal having an amplitude representative of a line having a maximum high frequency component during a second scan of the pattern; and means for gating the line having maximum high frequency component to the digitizer during the second scan.

13. A focused line identifier as recited in claim 11 wherein the analog means for identifying comprises:

a high pass filter for passing a high frequency component of the scan lines;

means connected to the filter for generating a signal representative of the amplitude of the high frequency component in each scan line during a scan across the pattern;

a first peak detector responsive to the amplitude;

a second peak detector responsive to the amplitude;

means for resetting the first peak detector every scan across the entire array and for resetting the second peak detector every second scan across the entire array; and means for gating at least one line to the digitizer when the first and second peak detectors both record a maximum amplitude during such a second scan across the array.

14. A focused line identifier as recited in claim 11 further comprising means for gating a line having maximum high frequency component to the digitizer during a third scan following the second scan.

15. A focused line identifier for a Scheimpflug optics bar code reader comprising:

photodetector means for generating a pattern of signals comprising a vertically extending plurality of horizontal scan lines including an image of a bar code from a Scheimpflug optical system;

a high pass filter for passing a high frequency component of the scan lines;

means connected to the filter for generating a signal representative of the amplitude of the high frequency component in each scan line during a scan across the pattern;

a first peak detector responsive to the amplitude;

a second peak detector responsive to the amplitude;

means for resetting the first peak detector every scan across the array and for resetting the second peak detector every second scan across the array; and means for gating at least one line to a digitizer when the first and second peak detectors both record a maximum amplitude during such a second scan across the array.

16. A focused line identifier as recited in claim 15 wherein the means for gating comprises:

comparator means for signalling when the amplitude detected by the first peak detector during the second scan is at least as high as the amplitude of the second peak detector;

a flip-flop for providing a pulse at the beginning of the next scan line when the comparator means signals; and a one shot for gating a line to a digitizer in response to the flip-flop pulse.

17. A focused line identifier as recited in claim 15 further comprising means for making the first peak detector amplitude larger than the second peak detector amplitude for a comparable input signal, and wherein the means for gating is enabled when the amplitude of the first peak detector is higher than the amplitude of the second peak detector during the second scan.

18. A focused line identifier as recited in claim 15 further comprising a blanking switch for disabling the focused line identifier between each horizontal scan line.

19. A focused line identifier as recited in claim 15 further comprising second gating means for gating a line to the digitizer during the next scan across the array after the second scan.

20. A focused line identifier as recited in claim 19 wherein the second gating means comprises delay means for delaying a signal an interval corresponding to substantially one scan across the array, and means for generating a gate enabling pulse at the end of such an interval.

21. A focused line identifier as recited in claim 20 wherein the interval differs from one scan across the array by no more than a few lines.

22. A focused line identifier as recited in claim 15 further comprising:

a plurality of auxiliary photodetectors at an end of the photodetector array, each auxiliary photodetector corresponding to a zone of horizontal lines in the photodetector array;

means for identifying the zone having brightest illumination reflected from a bar code; and means for gating lines from the identified zone to the high pass filter.

23. A focused line identifier as recited in claim 22 wherein the means for identifying the zone having brightest illumination comprises:

first and second peak detectors;

means for resetting the first peak detector every field;

means for resetting the second peak detector every other field; and means for producing an output signal when the first peak detector detects a zone having an illumination at least as large as the illumination detected by the second peak detector in the first field.

24. A focused line identifier for a bar code reader comprising:

photodetector means for generating a pattern of a vertical plurality of horizontal scan lines, at least one of the lines being illuminated by light reflected from a bar code;

auxiliary means at an end of the photodetector means subdividing the photodetector means into a plurality of zones of lines; and means for identifying the auxiliary means having the maximum illumination by light reflected from a bar code.

25. A focused line identifier as recited in claim 24 wherein the means for identifying the auxiliary means having maximum illumination comprises:

means for remembering for at least one full scan field the maximum illumination in a first scan field; and means for providing an output signal when the illumination in a subsequent scan field is at least as large as the remembered illumination.

26. A focused line identifier as recited in claim 24 wherein the means for identifying the auxiliary means having maximum illumination comprises:
first and second peak detectors;
means for resetting the first peak detector every field;
means for resetting the second peak detector every other field; and
means for producing an output signal when the first peak detector detects a zone having an illumination at least as large as the illumination detected by the second peak detector in the first field.

27. A method for operating a bar code reader having a two dimensional array of photodetectors for generating a train of signals representing scan lines across the array comprising the steps of:
identifying by analog means a line in the train of signals having the sharpest focus of light reflected from the bar code onto the array of photodetectors; and
gating a train of signals representing the identified line to a digitizer.

28. A method as recited in claim 27 further comprising the steps of:
illuminating a bar code with a sheet of light; and
imaging the illuminated bar code on the array of photodetectors with Scheimpflug optics.

29. A method as recited in claim 27 further comprising:
gating to the digitizer a train of signals representing at least one line adjacent to the identified line.

30. A method as recited in claim 27 wherein the identifying step comprises identifying a line having the maximum high frequency component.

31. A method as recited in claim 27 wherein the step of identifying a line comprises the steps of:
passing the train of signals through a high pass filter;
generating an envelope signal indicative of the amplitude of the high frequency component of the signal which passes through the high pass filter;
comparing the maximum amplitude of the envelope signal during a first scan across the array of photodetectors with the amplitude of the envelope signal during a second scan across the array; and
gating the train of signals to the digitizer when the amplitude of the envelope signal during the second scan is at least as large as the amplitude of the envelope signal during the first scan.

32. A method as recited in claim 27 further comprising the steps of:
dividing the array into a plurality of zones;
identifying a zone having maximum illumination from a bar code; and
gating a train of signals from the array during scan of the identified zone to the means for gating signals to the digitizer.

33. A focused line identifier as recited in claim 15 further comprising:
a plurality of auxiliary photodetectors at an end of the photodetector array, each auxiliary photodetector corresponding to a zone of horizontal lines in the photodetector array;
means for identifying the zone having the brightest modulated light; and
means for gating lines from the identified zone to the high pass filter.

* * * * *